(12) United States Patent
Bunting et al.

(10) Patent No.: US 11,740,996 B2
(45) Date of Patent: Aug. 29, 2023

(54) AUTOMATIC CREATION OF STRUCTURED ERROR LOGS FROM UNSTRUCTURED ERROR LOGS

(71) Applicant: Dell Products, L.P., Hopkinton, MA (US)

(72) Inventors: Chris Bunting, Carindale (AU); Evan Barry, Midleton (IE); Rahul Sasvehalli, Bangalore (IN)

(73) Assignee: Dell Products, L.P., Hopkinton, MA (US)

( * ) Notice: Subject to any disclaimer, the term of this patent is extended or adjusted under 35 U.S.C. 154(b) by 187 days.

(21) Appl. No.: 17/509,171

(22) Filed: Oct. 25, 2021

(65) Prior Publication Data
US 2023/0131162 A1  Apr. 27, 2023

(51) Int. Cl.
*G06F 11/36* (2006.01)
*G06F 16/25* (2019.01)

(52) U.S. Cl.
CPC .......... *G06F 11/364* (2013.01); *G06F 16/258* (2019.01)

(58) Field of Classification Search
None
See application file for complete search history.

(56) References Cited

U.S. PATENT DOCUMENTS

| | | | | |
|---|---|---|---|---|
| 9,779,012 | B1* | 10/2017 | Muralidaran | G06F 11/3648 |
| 10,176,078 | B1* | 1/2019 | Motel | G06F 11/3447 |
| 10,802,852 | B1* | 10/2020 | Wilmot | G06F 9/455 |
| 11,487,561 | B1* | 11/2022 | Wilmot | G06F 16/245 |
| 2008/0301644 | A1* | 12/2008 | Drepper | G06F 9/44589 717/124 |
| 2011/0029953 | A1* | 2/2011 | Pouyollon | G06F 11/3624 717/124 |
| 2015/0331783 | A1* | 11/2015 | Blackman | G06F 11/366 717/124 |

\* cited by examiner

*Primary Examiner* — Qing Chen
(74) *Attorney, Agent, or Firm* — Anderson Gorecki LLP (57) ABSTRACT

An error logging system is provided that is configured to automatically create a type introspection database from a compiled application that was written using the C programming language. During execution of the application, if there is an error, the executing application will generate an unstructured error log which is passed to an error logging system. The type introspection database enables the error logging system to parse the unstructured error log to create a corresponding structured error log. The error logging system includes generic display, search, and share functions. The display function is configured to display the name, value, and type, of every attribute in each data structure. The search function provides a way to determine if the structured error log satisfies a selection criteria specified on one or more attributes of the data. The share function enables the error logging system to export the structured error logs.

19 Claims, 12 Drawing Sheets

| Type name | Field name | Field Type | Field Offset |
|---|---|---|---|
| S_Long_trace_Example | error_code | unsigned long long | 0 |
| S_Long_trace_Example | time_stamp | unsigned long long | 8 |
| S_Long_trace_Example | device | unsigned long | 16 |
| S_Long_trace_Example | cylinder | unsigned long | 20 |
| S_Long_trace_Example | head | unsigned long | 24 |
| ... | ... | ... | ... |

FIG. 7

```
Sections:
Idx Name          Size      VMA               LMA               File off  Algn
119 .debug_abbrev 004f186c  0000000000000000  0000000000000000  0366efe4  2**0
                  CONTENTS, READONLY, DEBUGGING
120 .debug_aranges 00023210 0000000000000000  0000000000000000  03733580  2**4
                  CONTENTS, READONLY, DEBUGGING
121 .debug_frame  00334d90  0000000000000000  0000000000000000  0373b5d0  2**3
                  CONTENTS, READONLY, DEBUGGING
122 .debug_info   070feadb  0000000000000000  0000000000000000  037f1a3b  2**0
                  CONTENTS, READONLY, DEBUGGING
123 .debug_line   01082fbf  0000000000000000  0000000000000000  059b09dc  2**0
                  CONTENTS, READONLY, DEBUGGING
124 .debug_loc    02b5c963  0000000000000000  0000000000000000  05e9c366  2**0
                  CONTENTS, READONLY, DEBUGGING
125 .debug_macro  00d6a481  0000000000000000  0000000000000000  06796119  2**0
                  CONTENTS, READONLY, DEBUGGING
126 .debug_ranges 003dcef0  0000000000000000  0000000000000000  06aef69b  2**0
                  CONTENTS, READONLY, DEBUGGING
127 .debug_str    011039e8  0000000000000000  0000000000000000  06bb4d86  2**0
                  CONTENTS, READONLY, DEBUGGING
128 .debug_types  0037de66  0000000000000000  0000000000000000  070aaa12  2**0
                  CONTENTS, READONLY, DEBUGGING
```

FIG. 8

```
Contents of the .debug_types section:

Compilation Unit @ offset 0x5921e:
   Length:        0x234b (32-bit)
   Version:       4
   Abbrev Offset: 0xed1
   Pointer Size:  8
   Signature:     0x93356075b73ddfb1
   Type Offset:   0x1d
 <0><59235>: Abbrev Number: 1 (DW_TAG_type_unit)
    <59236>   DW_AT_language   : 12       (ANSI C99)
    <59237>   DW_AT_stmt_list  : 0x1c35
 <1><5923b>: Abbrev Number: 52 (DW_TAG_structure_type)
    <5923c>   DW_AT_name       : (indirect string, offset: 0x11fec4): S_DV_REC
    <59240>   DW_AT_byte_size  : 6528
    <59242>   DW_AT_decl_file  : 18
    <59243>   DW_AT_decl_line  : 273
    <59245>   DW_AT_sibling    : <0x5b0fb>
```

FIG. 9

```
<2><59249>: Abbrev Number: 43 (DW_TAG_member)
   <5924a>    DW_AT_name                : (indirect string, offset: 0x11583e): shared
   <5924e>    DW_AT_decl_file           : 18
   <5924f>    DW_AT_decl_line           : 277
   <59251>    DW_AT_type                : <0x5b0fb>
   <59255>    DW_AT_data_member_location: 0

<2><59256>: Abbrev Number: 43 (DW_TAG_member)
   <59257>    DW_AT_name                : (indirect string, offset: 0x1653b8):
pad_was_dv_sys_id_offset
   <5925b>    DW_AT_decl_file           : 18
   <5925c>    DW_AT_decl_line           : 277
   <5925e>    DW_AT_type                : <0x5b105>
   <59262>    DW_AT_data_member_location: 8
```

FIG. 10

```
# eddi.pl --struct S_DV_REC oarx.elf
Size (bytes): 6528
Members
     0 |   8 | struct S_DV_CSTS *    | shared
     8 |   1 | unsigned char         | pad_was_dv_sys_id_offset
     9 |   1 | unsigned char         | rdf_dv_mirror_mask
    10 |   1 | unsigned char         | rdf_snow_mirror_mask
    11 |   1 | unsigned char         | rp_dv_mirror_mask
    12 |   1 | unsigned char         | dv_mirror
    13 |   1 | unsigned char         | rdf_r1_dv_mirror_mask
    14 |   1 | unsigned char         | rdf_r2_dv_mirror_mask
    15 |   1 | unsigned char         | common_pad_1
    16 |   2 | short unsigned int    | pad_lock_holder
    18 |  10 | T_RDF_REC             | rdf
```

```
(gdb) offsets-of -r 'struct S_DV_REC'
offsets-of options: -r
recurse on
offsets of: struct S_DV_REC [6528]
{
    0x0   [0x8]  shared    -- pointer *struct S_DV_CSTS
    0x8   [0x1]  pad_was_dv_sys_id_offset
    0x9   [0x1]  rdf_dv_mirror_mask
    0xa   [0x1]  rdf_snow_mirror_mask
    0xb   [0x1]  rp_dv_mirror_mask
    0xc   [0x1]  dv_mirror
    0xd   [0x1]  rdf_r1_dv_mirror_mask
    0xe   [0x1]  rdf_r2_dv_mirror_mask
    0xf   [0x1]  common_pad_1
    0x10  [0x2]  pad_lock_holder
    0x12  [0xa]  rdf   -- struct S_RDF_REC {....}
struct rdf
{
    0x0   [0x8]  groups
    0x8   [0x1]  r2_r2lnkblk_mirror_mask
    0x9   [0x1]  adp_and_wp_off_mask
} struct rdf
```

AUTOMATIC CREATION OF STRUCTURED ERROR LOGS FROM UNSTRUCTURED ERROR LOGS

FIELD

This disclosure relates to computing systems and related devices and methods, and, more particularly, to a method and apparatus for creating structured error logs from unstructured error logs.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

According to some embodiments, an error logging system is provided that is configured to automatically create a type introspection database from a compiled application that was written using the C programming language. During execution of the application, if there is an error, the executing application will generate an unstructured error log which is passed to an error logging system. The type introspection database enables the error logging system to parse the unstructured error log to create a corresponding structured error log.

As used herein, the term "unstructured error log" refers to a set of bytes that contain the content of one or more data structures at the time an error occurred. However, the structure (or format) of the data is not available to the error logging system. As used herein, the term "structured error log" means that both the data and its structure (format) is shared with the error logging system, so that each value in the log can be accessed by name, type, and a value. The types are one of the "C" programming language built in data types. Example data types might include char, signed char, unsigned char, short, short int, short int signed, long, long int, long int signed, etc. There are multiple data types in the C programming language, and this list is merely intended to provide several examples of possible C data types.

The error logging system includes generic display, search, and share functions. The display function is configured to display the name, value, and type, of every attribute in each data structure. The search function provides a way to determine if the structured error log satisfies a selection criteria specified on one or more attributes of the data. The share function enables the error logging system to export the structured error logs.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
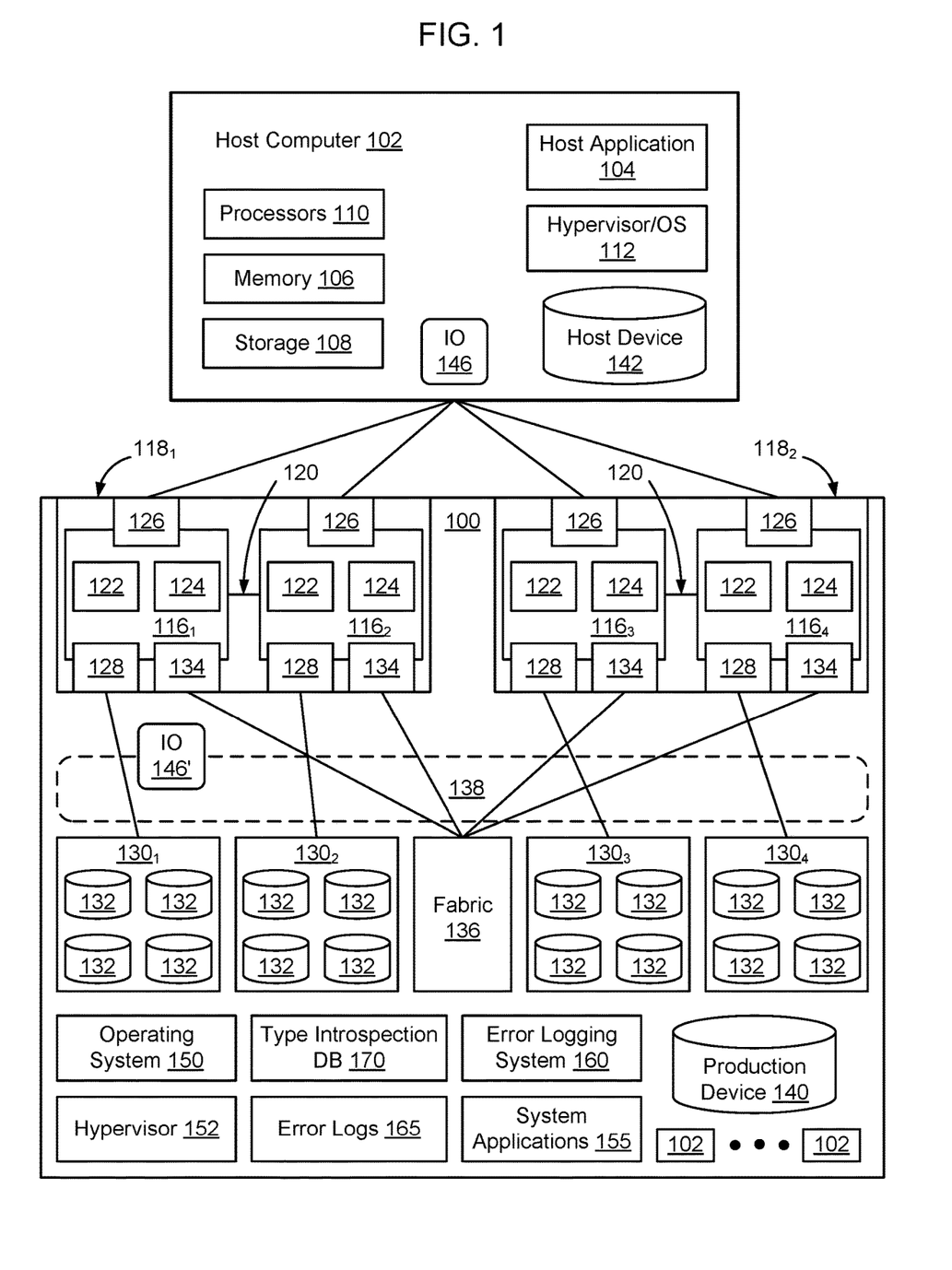
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g. including multiple CPUs, GPUs, and combinations thereof. The local volatile memory 124 may include, for example and without limitation, any type of RAM. Each compute node 116 may also include one or more front end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132.

A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g. via DMA (Direct Memory Access) or RDMA (Remote Direct Memory Access). Shared global memory 138 will also be referred to herein as the cache of the storage system 100.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared global memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

In the case where IO 146 is a read command, the storage system 100 uses metadata to locate the commanded data, e.g. in the virtual shared global memory 138 or on managed drives 132. If the commanded data is not in the virtual shared global memory 138, then the data is temporarily copied into the virtual shared global memory 138 from the managed drives 132 and sent to the host application 104 by the front-end adapter 126 of one of the compute nodes 116$_1$-116$_4$. In the case where the IO 146 is a write command, in some embodiments the storage system 100 copies a block being written into the virtual shared global memory 138, marks the data as dirty, and creates new metadata that maps the address of the data on the production device 140 to a location to which the block is written on the managed drives 132.

Computer systems, such as the storage system shown in FIG. 1, are often complicated systems that rely on multiple system applications 155 to function properly. These system applications and other applications such as host application 104, can be written in a variety of programming languages. One such well known programming language is the C programming language. When an application is written in the C programming language, it is compiled into object form, which then is able to be executed in the context of the operating system 150. Although some embodiments of automatic creation of structured error logs from unstructured error logs will be provided in connection with particular applications such as systems applications 155 and host applications 104, the methods and systems for the automatic creation of structured error logs from unstructured error logs can be implemented in connection with any "system" created using the C programming language.

When a compiled application that was written in the C programming language encounters an error during execution, the compiled application can be configured to generate an error log, to capture the occurrence of important errors or events. Depending on the implementation of the C program, the error record may contain a timestamp, a unique identifier (error code) and some other attributes like the director, device, cylinder, head, program counter, and other error code specific fields. Typically, an error log includes a long trace of values that based on the state of the stack, CPU registers, and a snapshot of important data structures about the state of the IO, device, port, HBA, etc. at the time of the error. In a complex storage system such as the storage system shown in FIG. 1, the error log generated by an executing C program can contain 4000 or more distinct values that are potentially useful for real time and root cause analysis.

Unfortunately, the data captured in the error log may be underutilized because there is a paucity of search and display functionality. Searching for attributes with particular values is limited to a very small subset of the attributes. Display functions often show only a subset of the data or are limited to displaying a dump in a hexadecimal format. The paucity in search, display and archive functionality is primarily due to a limitation of the C programming language, which does not support type introspection. Type introspection refers to the ability of an executing program to examine the type and properties of a data structure at runtime. This means that the executing C program does not have a way to programmatically determine the name and type of the individual members of a data structure or union at run time. Accordingly, the executing C program cannot include information about the data structures in the error log, and therefore the executing C program cannot natively provide information in the unstructured log that will enable the error logging system to create a structured error log. Since the error log is unstructured when it is received by the error logging system, there is no straight forward way to write generic functions in the error logging system that would enable the error logging system to natively search, display, or export all the data structures in the logs.

One way to attempt to overcome this limitation is to generate and maintain individual functions in the error logging system that will allow the error logging system to interpret the unstructured error logs generated by the executing C program. For example, the error logging system may be provided with a set of print functions that will allow the error logging system to print particular aspects of the data structures that are used by the executing C program. This can be an arduous task for complex data structures. For example, to view the content of particular data structures, developers generally write data structure specific functions for the error logging system, where the printing of each field and its value is hard coded in the error logging system. For example, the following code can be used by an error logging system to print several fields of a long trace generated by an example compiled C program, when the compiled C program has an execution error during runtime:

```
void display_s_error_log(struct S_ERROR_LOG *data)
{
    printf("error_code = % llx\n", data->error_code);
    printf("time_stamp = % s\n", ctime(data->type_stamp));
    printf("device = % x\n", data->device);
    printf("cylinder = % x\n", data->cylinder);
    printf("head = % x\n", data->head);
}
```

This is an arduous task for very large or complex data structures, so oftentimes the display functions that are created for the error logging system are only written to output a subset of the fields. In many cases, no display function is ever created. Hardcoding type specific functions also creates a maintenance challenge, since every time the data structures of a C program are changed, the functions used by the error logging system to display portions of the unstructured error logs containing information associated with the data structure also need to be updated. Over time, the functions implemented in the error logging system tend to get out of sync with the data structures of the C program, and their value is diminished.

According to some embodiments, an error logging system is provided that is configured to automatically create a type introspection database from a compiled C program, that will enable the error logging system to create a structured log from an unstructured error log. The type introspection database is used by the error logging system to create a structured error log, which can be used by generic display, search, and share functions of the error logging system. In some embodiments, the display function is configured to display the name, value, and type, of every attribute in each data structure. The search function provides a way to determine if a record satisfies a selection criteria specified on one or more attributes of the data using a rich set of numeric, text, bit, date, time, and logical operators. The share function enables the structured log to be exported to be shared using one or more industry formats.

Figure 2:
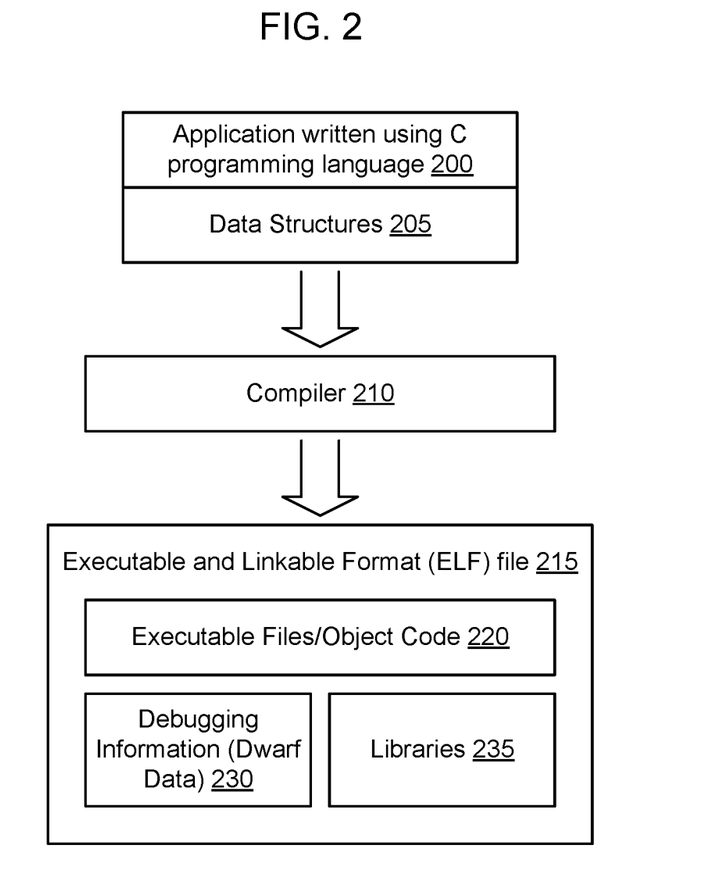
FIG. 2 is a functional block diagram illustrating compilation of an application program written in the C programming language to create an ELF (Executable and Linkable Format) file including application debugging information, according to some embodiments.

FIG. 2 is a functional block diagram illustrating compilation of an application program written in the C programming language to create an ELF (Executable and Linkable Format) file including application debugging information, according to some embodiments. As shown in FIG. 2, an application written in C code is commonly configured to have a set of data structures 205 that are used to store various parameters associated with the application when the application is executed. To enable the application to run, the source code 200 is passed to a compiler 210, which generates an Executable and Linkable File (ELF) file 215. The ELF file includes the executable files/object code 220, any libraries 235 used by the executable files 220, and debugging information 230. The ELF file can also contain other files, depending on the implementation.

If an error occurs in an executing compiled C application, an error log will be created by taking a snapshot of important data structures when the error occurred. This error log may contain many (e.g. thousands) of individual data values. However, once the application written in the C programming language (referred to herein as a "C program") is compiled, there is no built-in way for the executing C program to get the name or type of each data structure that was used to generate the error log. Specifically, because C does not support type introspection, during run-time there is no built-in way to get the name or type of each member of each data structure. This means that the executing C program cannot natively generate a structured log.

According to some embodiments, an error logging system is provided that is configured to create a type introspection database from debugging information contained in the ELF file of a compiled C program. When an unstructured error log from the executing C program is received by the error logging system, the error logging system uses the type introspection database to generate a structured log, which may be used by generic search, display, and share functions of the error logging system. Since the type introspection database is able to be created directly from the ELF file, any changes to the data structures that occur in connection with changes to the C program are able to be propagated to the error logging system once the C program is recompiled, simply by having the error logging system create a new type introspection database from the newly created ELF file. Accordingly, it is not necessary to generate new print functions for the error logging system in connection with making changes to the C program, which greatly simplifies the process of coordinating changes to the C program with corresponding changes to the error logging system.

Figure 3:
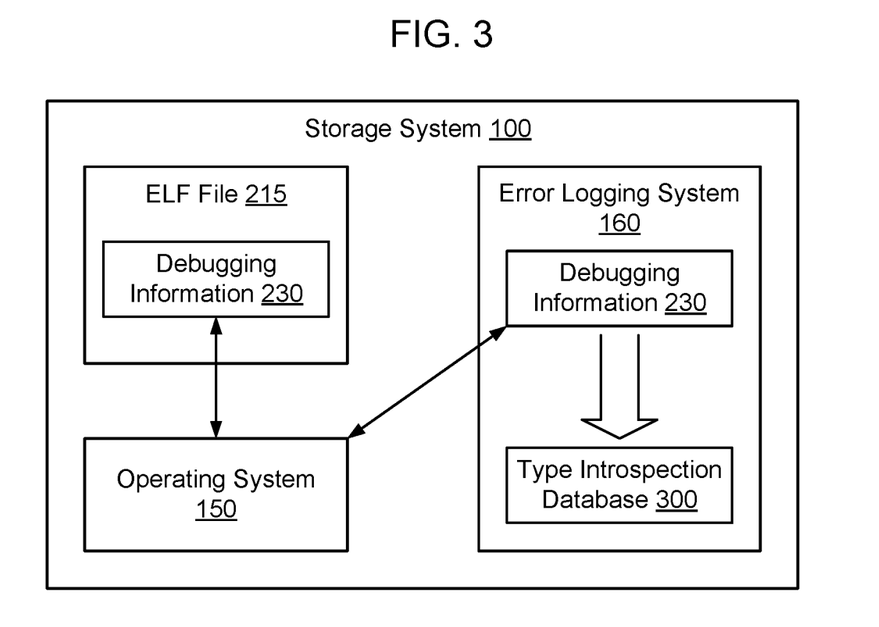
FIG. 3 is a functional block diagram showing an example process of reading debugging information from the ELF file by an error logging system to create a type introspection database, according to some embodiments.
Figure 7:
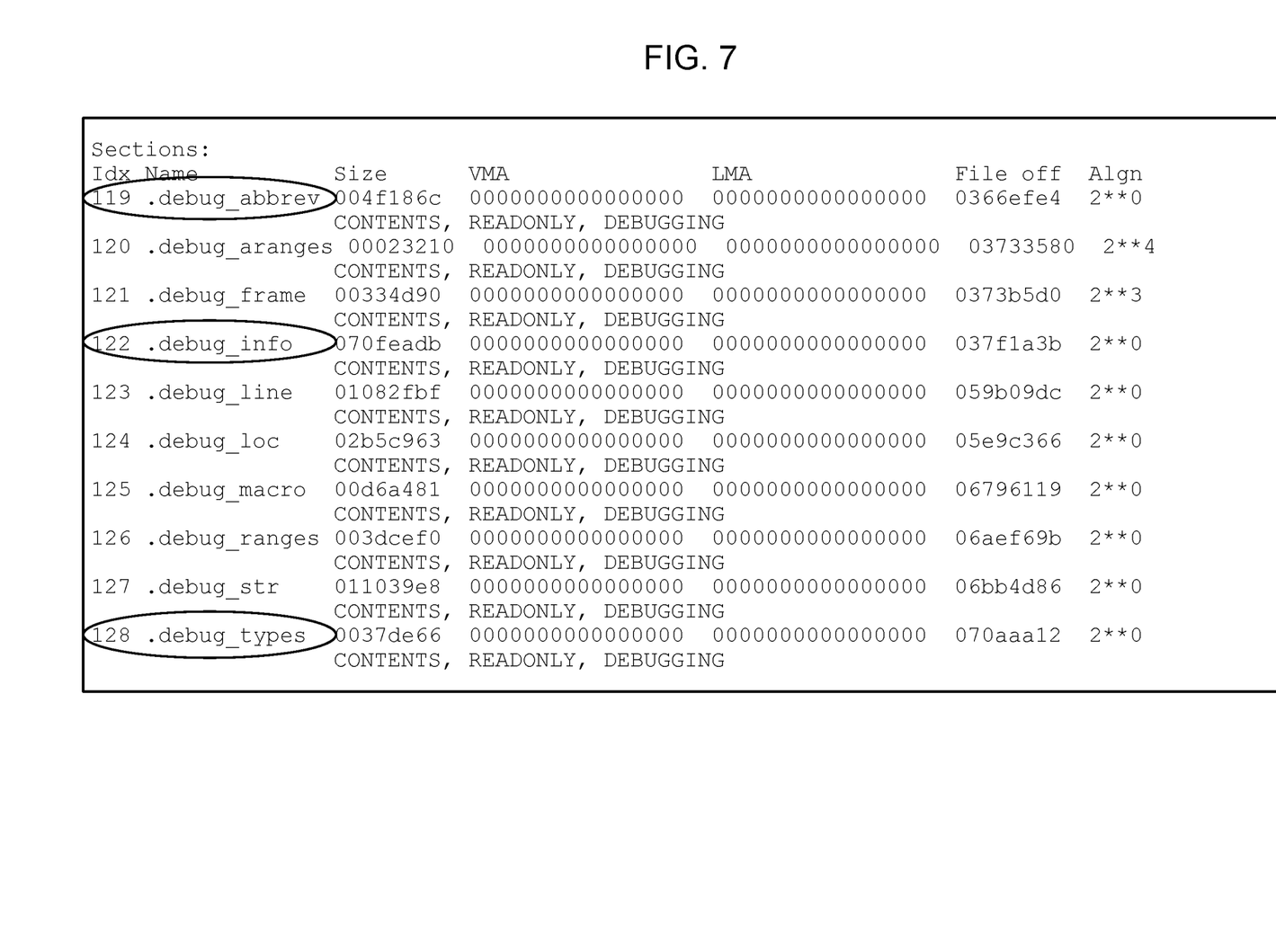
FIG. 7 is a functional block diagram of a data structure containing a subset of headers of an example ELF file entitled oarx.elf, according to some embodiments.

FIG. 3 is a functional block diagram showing an example process of reading the debugging information from the ELF file by an error logging system to create a type introspection database 300, according to some embodiments. As shown in FIG. 3, when the GNU Compiler Collection (GCC) compiles a program written in the C programming language, it saves debugging information in the executable ELF file. This information can be displayed on Linux using an objdump command. For example, the Linux command:

objdump --headers oarx.elf can be used to display the names of each section in an ELF file entitled oarx.elf. FIG. 7 is a functional block diagram of a data structure containing a subset of the headers of an example ELF file entitled oarx.elf. As shown in FIG. 7, the oarx.elf file includes section 128: .debug_types, section 119: .debug_abbrev, and section 122: .debug_info, which contain detailed information about the data structures used by the program. These are saved in the ELF file in DWARF format. DWARF (Debugging With Attributed Record Format) is a widely used, standardized, debugging data format.

Figure 6:
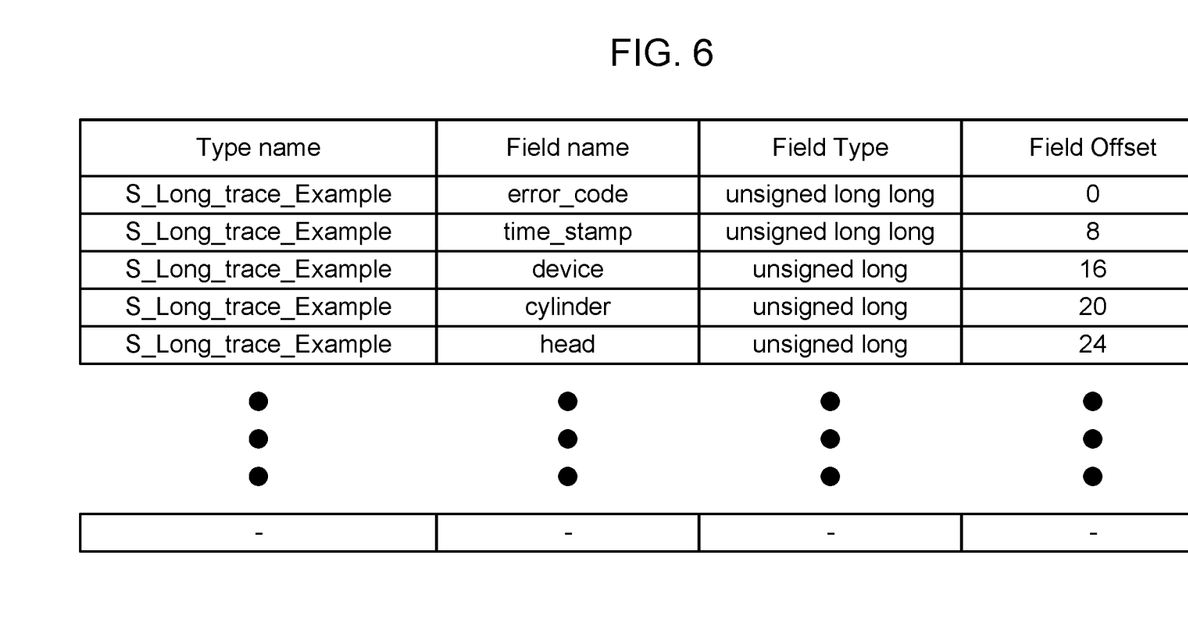
FIG. 6 is a functional block diagram of a portion of an example type introspection database, according to some embodiments.

The DWARF data of interest can be displayed using a command such as:

objdump --dwarf=info,abbrev oarx.elf which displays the DWARF data in the .debug_info, .debug_abbrev, and .debug_types sections in the file oarx.elf. This information is then used, by the error logging system, to build a type introspection database 300. A portion of an example type introspection database is shown in FIG. 6.

Figure 8:
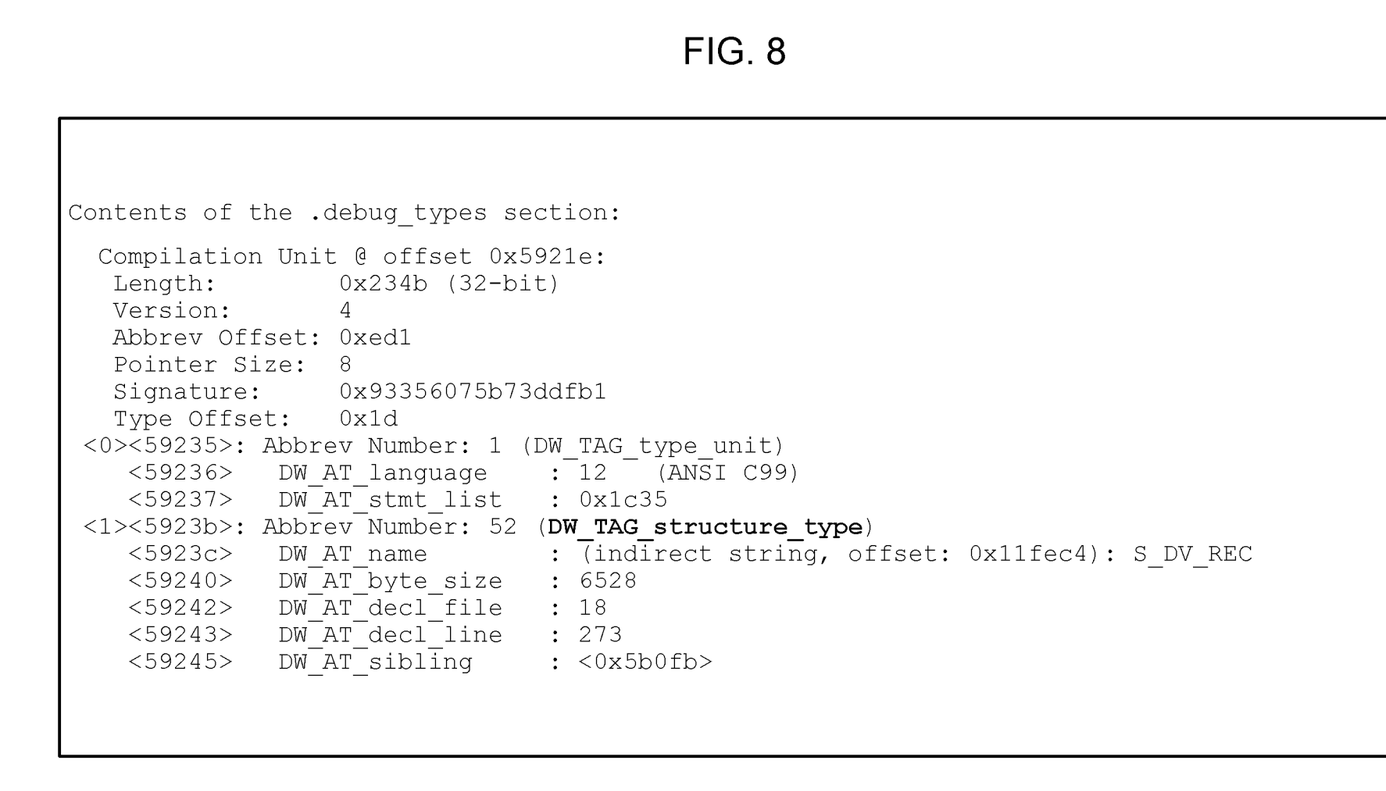
FIG. 8 is a functional block diagram of a data structure containing a portion of information contained in the .debug_types section of the debugging information of the ELF file of FIG. 7, according to some embodiments.
Figure 9:
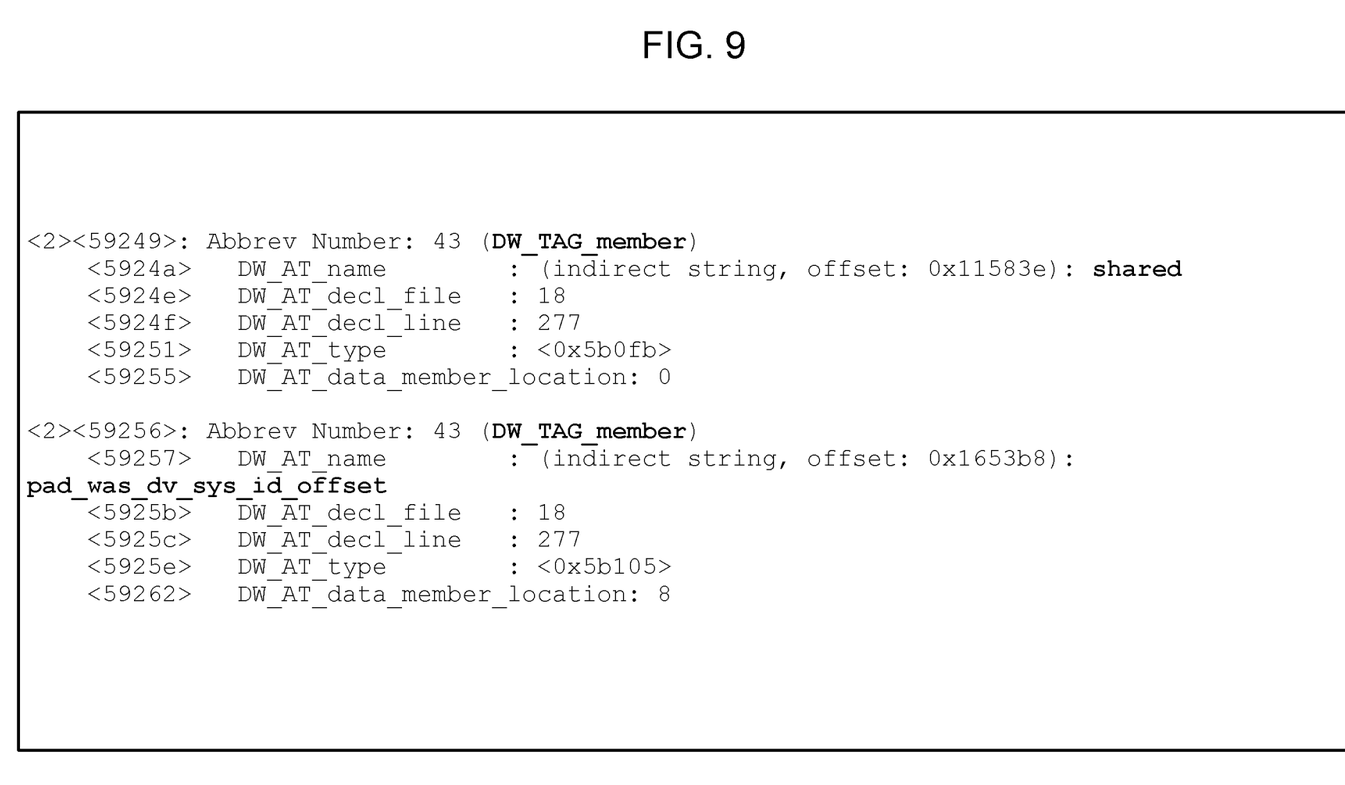
FIG. 9 is a functional block diagram of a data structure containing a portion of information contained in two selected members of the .debug_types section of FIG. 8, according to some embodiments.
Figure 10:
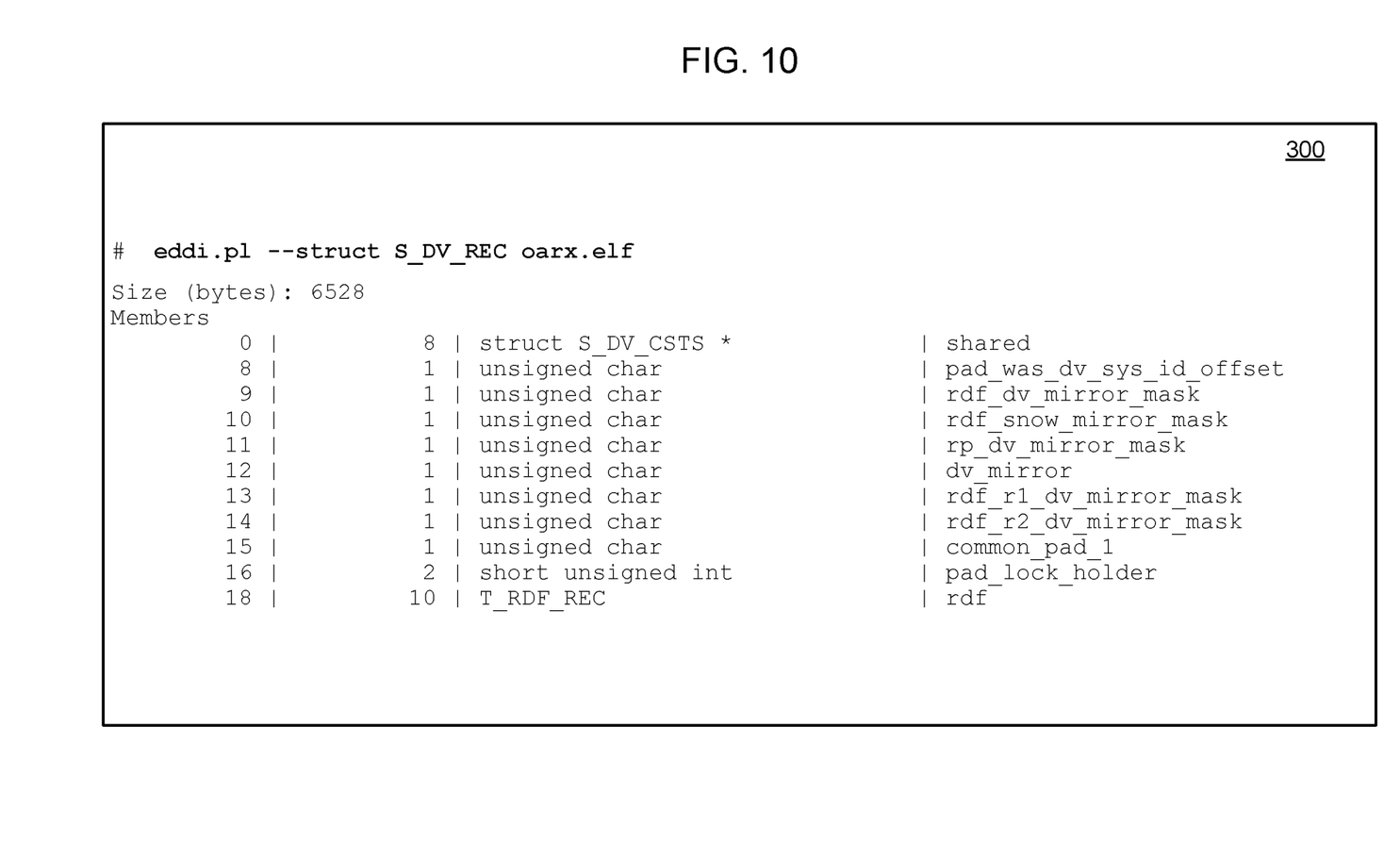
FIG. 10 is a functional block diagram of an example type introspection database data structure, according to some embodiments.

FIG. 8 is a functional block diagram of a data structure containing a small portion of information contained in the .debug_types section from the oarx.elf file, according to some embodiments. Specifically, in this example the .debug_types section of the oarx.elf file includes a S_DV_REC data structure, which is shown in FIG. 8. Each member of the S_DV_REC data structure also has its own record. Two example records are shown in FIG. 9. The information provided by the .debug_types section of the oarx.elf file can then be converted into a more human readable data structure. An example human readable data structure configured to implement the type introspection database 300 is shown in FIG. 10.

Since the error logging system is able to generate the type introspection database 300 from the debugging information contained in the ELF file, which is created when the application written in C programming language is compiled, it is not necessary to manually update print statements in the error logging system whenever a data structure 205 of the application written in the C programming language changes. Rather, once the updated C program is compiled, the error logging system can simply issue commands to the Linux operating system to retrieve the debugging information from the new ELF file, and then use the new debugging information to create a new corresponding type introspection database 300. Since this is an automated process, no manual changes are required to be implemented in the error logging system 160 to synchronize the error logging system 160 with the changed application 200.

Figure 4:
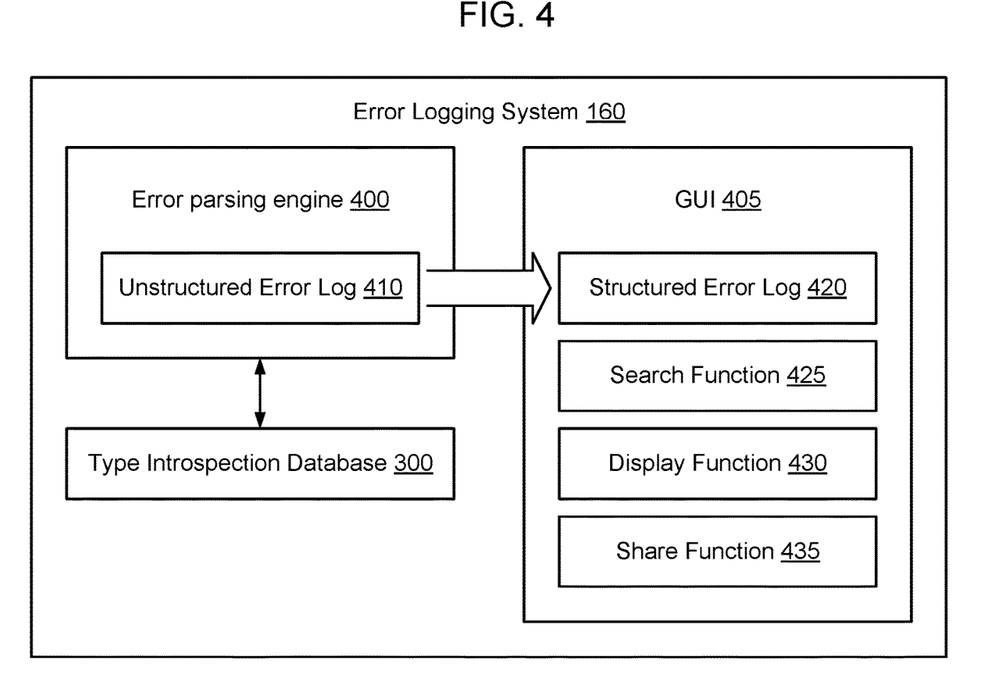
FIG. 4 is a functional block diagram showing an example process of using the type introspection database by an error logging system to create a structured error log from an unstructured error log, according to some embodiments.

FIG. 4 is a functional block diagram showing an example process of using the type introspection database 300 by an error logging system 160 to create a structured error log 420 from an unstructured error log 410, according to some embodiments. As shown in FIG. 4, in some embodiments, the error logging system 160 includes an error parsing engine 400 that receives the unstructured error log 410 and uses the type introspection database 300 to create the structured error log 420. The error logging system 160 includes a Graphical User Interface 405 that is configured to display aspects of the structured error log 420. For example, the error logging system may include a search function 425, display function 430, and share function 435, that enable operations to be implemented on the structured error log 420.

In some embodiments, the error parsing engine uses the type introspection database in connection with the search, display, and share functions for displaying, searching, and sharing the values of the data structures captured in the unstructured error log. In some embodiments, the display function 430 is configured to display the name, value, and type, of every attribute in each data structure. The search function 425 provides a way to determine if a record satisfies a selection criteria specified on one or more attributes of the data using a rich set of numeric, text, bit, date, time, and logical operators. The share function 435 enables the structured error log 420 to be shared using one or more industry formats, for example to enable the structured error log 420 to be analyzed using another error logging system.

In some embodiments, the structured error log 420 is shared using JavaScript Object Notation (JSON). JSON is a ubiquitous format that can be used to store structured logs, though there are many other formats including the Common Event Format (CEF) which is an open logging and auditing format from ArcSight, the Graylog Extended Log Format (GELF), the NCSA Common log format, the Extended Log Format (ELF), W3C Extended Log Format and others. The particular format which the error logging system shares a structured error log will depend on the particular implementation.

There are many tools that can query JSON files. The jq utility can be used to query, filter, or transform JSON into other formats. Databases such as MySQL, Postgres, Microsoft SQLServer, and Oracle all have support for searching JSON data. The particular function that is used by the error logging system to search through the structured error log will depend on the particular implementation.

As used herein, the term "generic" refers to the fact that the function is not required to be changed in the error logging system to enable the error logging system to interact with error logs from different executing C programs. Accordingly, a "generic search function" is a function, for example, can be used by an error logging system to search any structured error log 420 that is created by the error logging system 160. An error logging system might create multiple type introspection databases for multiple respective executing C programs, for example, and use the respective type introspection databases to generate structured logs each time one of the executing C programs generates an unstructured error log. The same generic search function is used by the error logging system to interact with the structured logs regardless of which type introspection database was used to generate the structured log.

Figure 5:
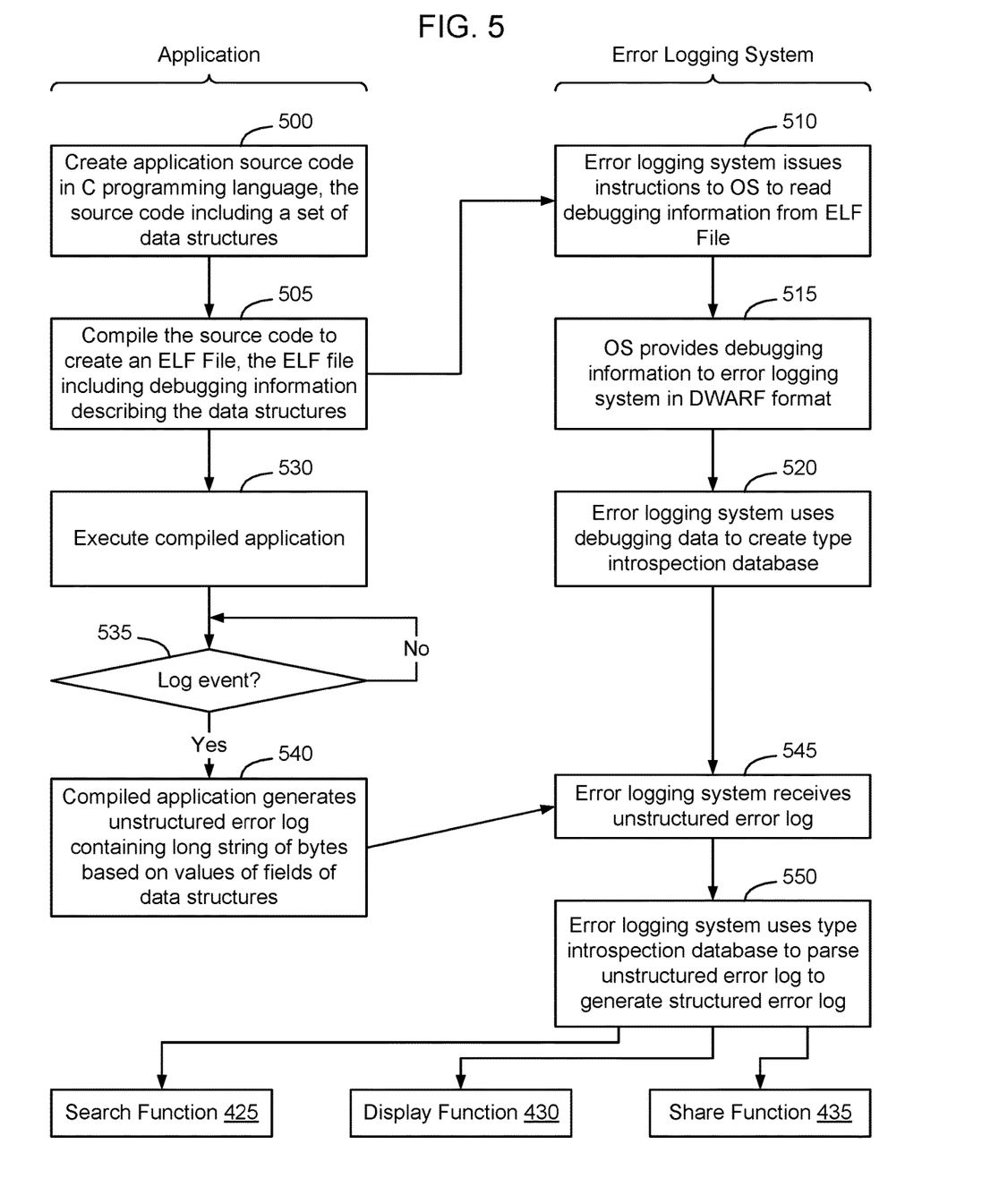
FIG. 5 is a flow chart of an example process of creating a type introspection database and using the type introspection database to create a structured error log from an unstructured error log, according to some embodiments.

FIG. 5 is a flow chart of an example process of creating a type introspection database and using the type introspection database to create a structured error log 420 from an unstructured error log 410, according to some embodiments. As shown in FIG. 5, application source code is created in the C programming language which includes a set of data structures (block 500). The source code is then compiled to enable the application to be executed by one or more processors. During the compile process, the compiler creates an ELF file, which includes debugging information describing the data structures of the C program (block 505).

Once the C program has been compiled, the error logging system that is going to be used to analyze errors generated by the C program builds a type introspection database for the C program. To this, in some embodiments, the error logging system issues instructions to the operating system to read debugging information from the ELF file (block 510). The operating system provides the debugging information to the error logging system in DWARF format (block 515), and the error logging system uses the debugging data to create the type introspection database (block 520).

Once compiled, the application is executed (block 530). If an error occurs in the executing C program (a determination of YES at block 535), the compiled application generates an unstructured error log containing a string of bytes based on values of the fields of the data structures and other aspects of the executing C program at the time of the error (block 540).

The unstructured error log is received by the error logging system (block 545) and the error logging system uses the type introspection database that was created for the C program from the ELF file to parse the unstructured error log to generate a structured error log (block 550). The error logging system 160 uses a generic search function 425, display function 430, and share function 435, to enable the structured error log 420 or portions of the structured error log 420 to be displayed on GUI 405.

Figure 11:
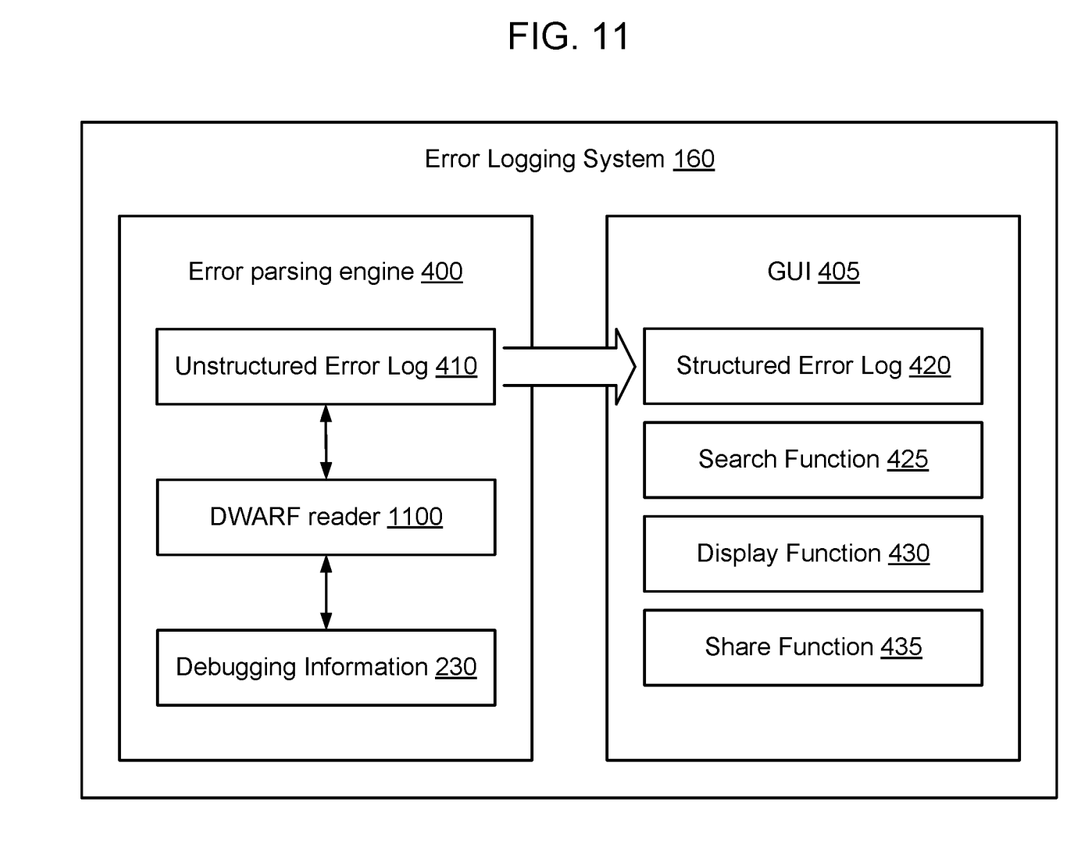
FIG. 11 is a functional block diagram of a portion of an example error logging system containing a DWARF reader configured to read debugging information obtained from an ELF file of a compiled C program, according to some embodiments.

FIG. 11 is a functional block diagram of a portion of an example error logging system containing a DWARF reader configured to read debugging information obtained from an ELF file of a compiled C program, according to some embodiments. In some embodiments, instead of reading the debugging information from the ELF file and parsing the debugging information to create a type introspection database, the error logging system is instead configured to read the DWARF data directly to create the type introspection database.

Figure 12:
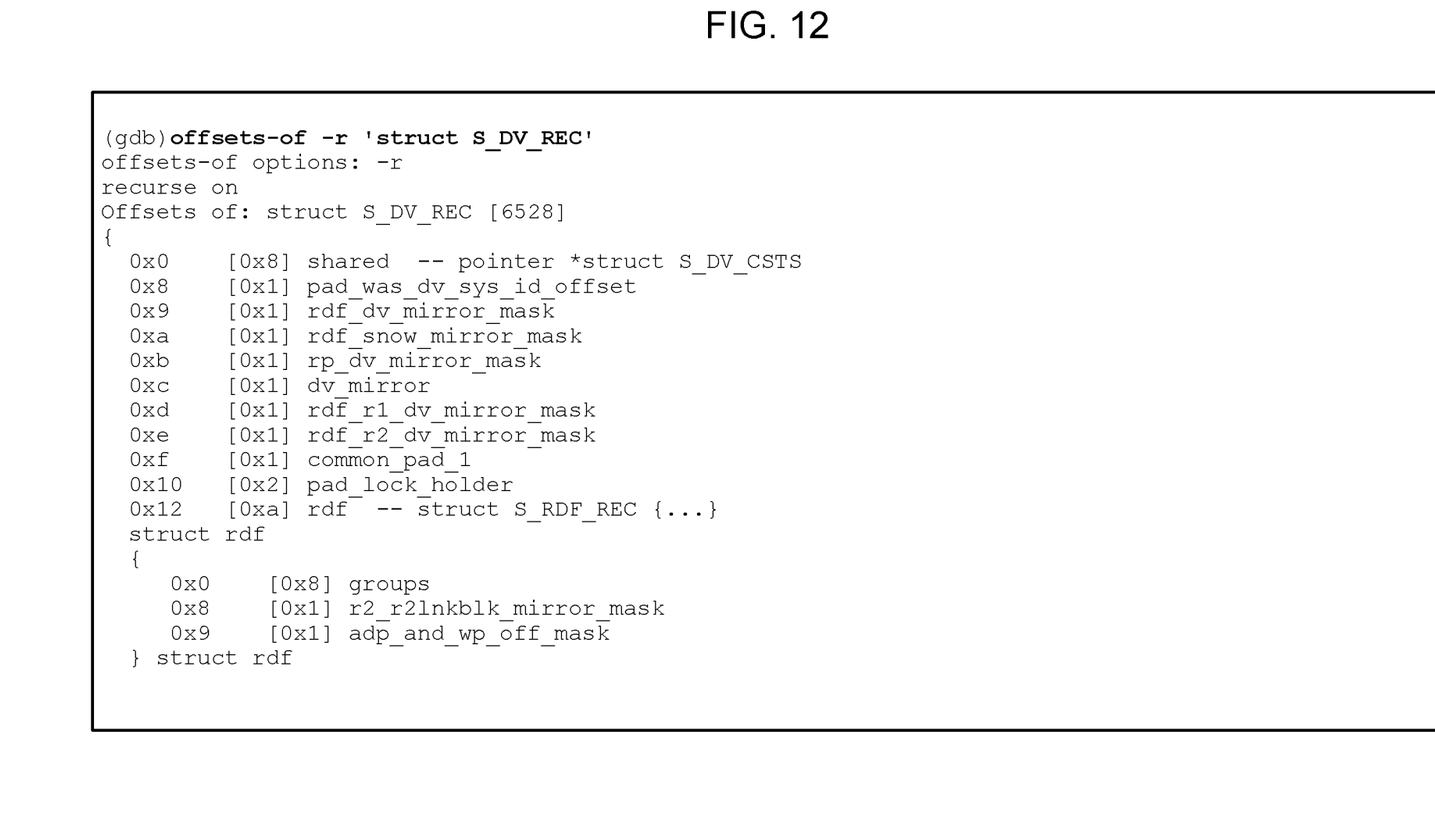
FIG. 12 is a functional block diagram of a data structure containing a portion of data created by the DWARF reader of FIG. 11, according to some embodiments.

For example, as shown in FIG. 11, the error logging system 160, in some embodiments, includes an error parsing engine 400. The error parsing engine includes a DWARF reader 1100 that reads the debugging information of a C program that is written using the DWARF format. In this embodiment, instead of processing the objdump output, the error logging system stores the debugging information 230 in the DWARF format, and uses the DWARF reader to read the DWARF data directly. For example, GDB (GNU Project Debugger) provides some functionality to inspect the contents of data structures in real time. In some embodiments, the DWARF reader of the GDB is used to parse the DWARF data by the error logging system to enable the error logging system to generate a type introspection database that can then be used during runtime to generate structured error logs 420. For example, FIG. 12 shows a set of data produced using a GDB DWARF reader which implements an "offsets-of" command written in Python to generate the type introspection database. This command was created using a GDB python API. As shown in FIG. 12, using a DWARF reader it is possible to determine the offsets of each of the fields of the data structures, to thereby enable the error logging system to create a type introspection database that can be used to generate structured error logs 420 from the unstructured error logs 410.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for creating structured error logs from unstructured error logs, the computer program including a set of instructions which, when executed by a computer, cause the computer to perform a method comprising the steps of:
    compiling an application written using the C programming language (a compiled C program) to create an Executable and Linkable Format (ELF) file, wherein the ELF file contains executable files and debugging information describing data structures used by the executable files;
    reading the debugging information from the ELF file by an error logging system;
    creating a type introspection database using the debugging information from the ELF file by the error logging system;
    using the executable files to execute an instance of the compiled C program in a context of an operating system;
    receiving an unstructured error log from the executing instance of the compiled C program; and
    using the type introspection database, by the error logging system, to create a corresponding structured error log from the unstructured error log.

2. The non-transitory tangible computer readable storage medium of claim 1, wherein the step of reading the debugging information from the ELF file comprises issuing instructions to an operating system to cause the operating system to extract the debugging information from the ELF file.

3. The non-transitory tangible computer readable storage medium of claim 1, wherein the type introspection database includes offset information identifying fields of data structures used by the compiled C program.

4. The non-transitory tangible computer readable storage medium of claim 3, wherein the unstructured error log is a string of concatenated values, and wherein the offset information identifies data types and locations and ranges of locations within the unstructured error log.

5. The non-transitory tangible computer readable storage medium of claim 4, wherein the structured error log is a data structure in which data contained in the data structure is organized into fields, and wherein each field has a name, a type, and a value.

6. The non-transitory tangible computer readable storage medium of claim 5, where each type is one of the C programming language built in data types.

7. The non-transitory tangible computer readable storage medium of claim 1, further comprising using a generic display function by the error logging system to display portions of the structured error log via a user interface.

8. The non-transitory tangible computer readable storage medium of claim 1, further comprising using a generic search function by the error logging system to search fields of the structured error log.

9. The non-transitory tangible computer readable storage medium of claim 1, further comprising using a generic share function by the error logging system to share portions of the structured error log outside of the error logging system.

10. A method of creating a structured error log from an unstructured error log, comprising:
    compiling an application written using the C programming language (a compiled C program) to create an Executable and Linkable Format (ELF) file, wherein the ELF file contains executable files and debugging information describing data structures used by the executable files;
    reading the debugging information from the ELF file by an error logging system;
    creating a type introspection database using the debugging information from the ELF file by the error logging system;
    using the executable files to execute an instance of the compiled C program in a context of an operating system;
    receiving an unstructured error log from the executing instance of the compiled C program; and
    using the type introspection database, by the error logging system, to create a corresponding structured error log from the unstructured error log.

11. The method of claim 10, wherein the step of reading the debugging information from the ELF file comprises issuing instructions to the operating system to cause the operating system to extract the debugging information from the ELF file.

12. The method of claim 10, wherein the type introspection database includes offset information identifying fields of data structures used by the compiled C program.

13. The method of claim 12, wherein the unstructured error log is a string of concatenated values, and wherein the offset information identifies data types and locations and ranges of locations within the unstructured error log.

14. The method of claim 13, wherein the structured error log is a data structure in which data contained in the data structure is organized into fields, and wherein each field has a name, a type, and a value.

15. The method of claim 14, where each type is one of the C programming language built in data types.

16. The method of claim 10, further comprising using a generic display function by the error logging system to display portions of the structured error log via a user interface.

17. The method of claim 10, further comprising using a generic search function by the error logging system to search fields of the structured error log.

18. The method of claim 10, further comprising using a generic share function by the error logging system to share portions of the structured error log outside of the error logging system.

19. A method of creating a structured error log from an unstructured error log, comprising:
    compiling an application written using the C programming language (a compiled C program) to create an Executable and Linkable Format (ELF) file, wherein the ELF file contains executable files and debugging information describing data structures used by the executable files;

reading the debugging information from the ELF file by an error logging system, wherein the debugging information from the ELF file is formatted using a Debugging With Attributed Record Format (DWARF) format;

using a DWARF reader to create a type introspection database using the debugging information from the ELF file by the error logging system;

using the executable files to execute an instance of the compiled C program in a context of an operating system;

receiving an unstructured error log from the executing instance of the compiled C program; and using the type introspection database, by the error logging system, to parse data of the unstructured error log to create a corresponding structured error log.

\* \* \* \* \*